July 13, 1937.  C. PFANSTIEHL  2,087,041
METHOD OF FORMING METALLIC TIPS
Filed Jan. 15, 1936  2 Sheets-Sheet 1
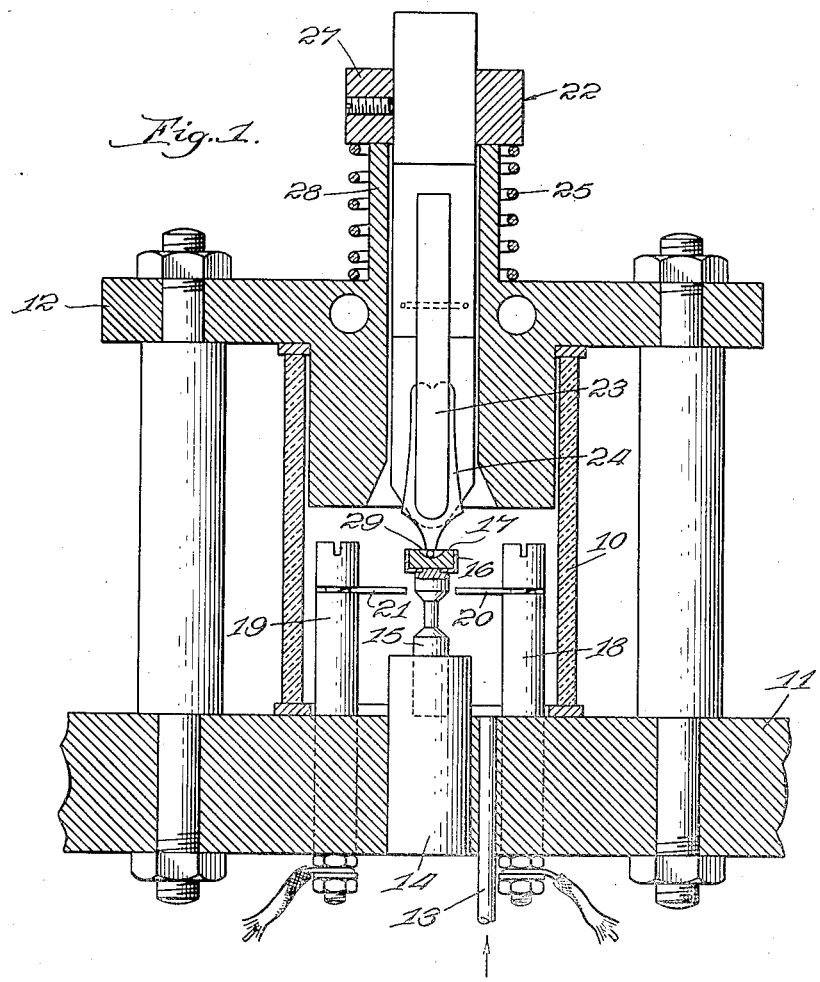
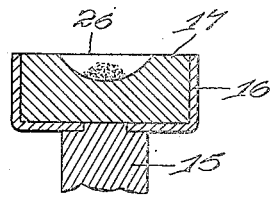
Inventor:
Carl Pfanstiehl.
By Dyrenforth, Lee, Chritton & Wills
Attys.

July 13, 1937.                C. PFANSTIEHL                2,087,041
                      METHOD OF FORMING METALLIC TIPS
                    Filed Jan. 15, 1936        2 Sheets-Sheet 2
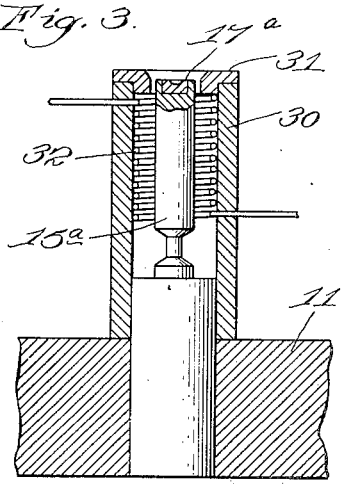
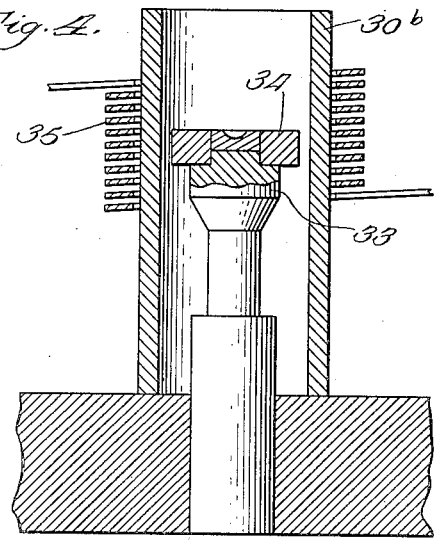
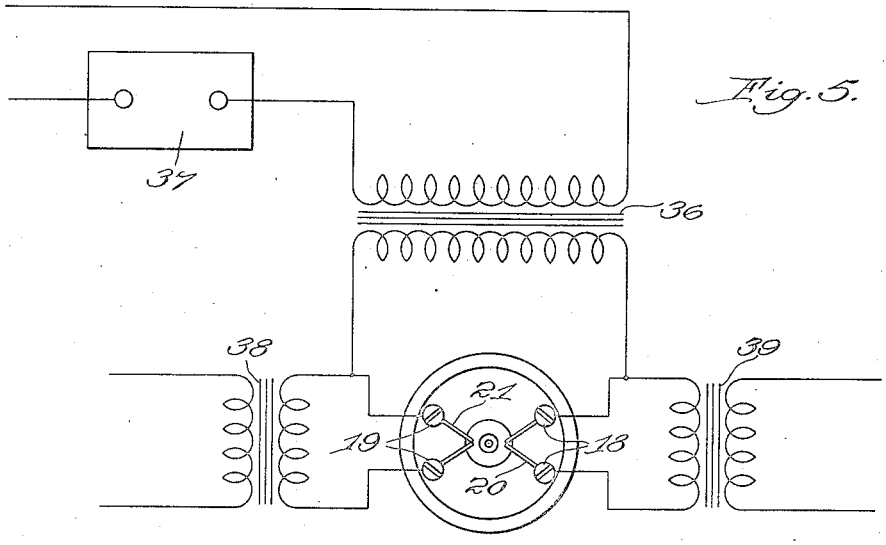
Inventor:
Carl Pfanstiehl.
By Dyrenforth, Lee, Chritton & Wiles
Attys.

Patented July 13, 1937

2,087,041

UNITED STATES PATENT OFFICE 2,087,041

METHOD OF FORMING METALLIC TIPS

Carl Pfanstiehl, Highland Park, Ill., assignor to Pfanstiehl Chemical Company, a corporation of Illinois Application January 15, 1936, Serial No. 59,299

4 Claims. (Cl. 113—32)

This invention relates to forming metallic tips, and more particularly to a method of tipping metallic bases, such as pen points and other like articles.

In my U. S. Patent No. 2,005,752, issued June 25, 1935, there is described a method of tipping metallic bases in which the tip is first tacked to the metallic article and is then welded by heat supplied substantially entirely through the tip.

In my co-pending application, Serial No. 36,229, filed August 14, 1935, now Patent 2,032,887, issued March 3, 1936, is described a method of welding tips to metallic bases without preliminarily tacking them in place, but in which the tip and base are held in lightly pressed contact while welding.

In the case of certain materials it has now been found advantageous to form a tip upon a base by fusing a small portion of tip material upon a medium which it does not wet, the amount of material being small enough that it will spheroid itself by surface tension upon fusion, and then dipping the base into the formed spheroid, which has the effect of freezing the spheroid and firmly welding it to the base.

This method is particularly applicable to the welding of high melt point materials such as iridium upon relatively low melt point bases such as steel.

The invention is illustrated diagrammatically in the drawings, in which—

Fig. 1 is an elevation, partly in section and partly broken away, of the welding apparatus; Fig. 2 is a sectional elevation, much enlarged, of the crucible and support; Fig. 3 is a similar sectional elevation of a modified heating element and crucible; Fig. 4 is a similar view of a further modification; and Fig. 5 is a diagrammatic wiring plan for the welding apparatus shown in Fig. 1.

As illustrated in Fig. 1, the welding apparatus comprises a Pyrex tube 10 resting in a refractory base 11, for example of "bakelite" or Alberene stone, and substantially closed at the top by a copper water-cooled plate 12.

The base 11 is provided with a passageway 13 connected to a source of hydrogen, through which hydrogen may be slowly admitted to the tube 10. A ceramic post 14 is centrally positioned in the base within the tube 10 and a tungsten, or other refractory metal, post 15 is imbedded therein. Upon the post is firmly set a molybdenum or tungsten cup washer 16 holding a ceramic crucible 17. This crucible is preferably of a heat-treated lime which has been heated at a high temperature after substantially all of the carbon dioxide has been expelled therefrom. Such a crucible is particularly suitable for use with very high melt point metals, and especially such as are described in my co-pending application, Serial No. 753,220, filed November 15, 1934. Any sufficiently refractory crucible which the metal does not wet may be employed, however.

Diametrically opposed posts 18 and 19 are provided within the tube 10 and are imbedded in the base 11 and connected to a circuit, as shown in Fig. 5. Filaments 20 and 21 are set in the posts at a height just below the cup 16 and the crucible 17.

A pen nib holder 22, provided with jaws 23 and adapted to hold a pen nib 24, seats itself on the spring 25 a short distance above the crucible 17. In normal operations it has been found satisfactory to maintain the pen nib about ⅜ inch above the crucible. In operation, sufficient metal to form a tip of the desired size is measured and dropped into the crucible, either in powdered form or otherwise, as indicated at 26 in Fig. 2. The electric circuit may then be turned on and maintained until the metal has completely fused and formed a spheroid of molten metal. In the case of alloys described in my application, Serial No. 753,220, it is advantageous to maintain the pellet molten for some time.

In many instances, it is found preferable to maintain the current continuously, simply dropping in measured amounts of metal from time to time.

When the metal has fused sufficiently, the holder 22 is pressed down until the cross piece 27 engages the annulus 28 on the top 12. At this point the pen nib will dip into the fused spheroid 29 and will instantaneously freeze it thereon.

While it is obvious that the pen nib cannot be kept in this position long without its fusing, particularly where it is of a lower melt point metal than the tip, the time interval is not critical, and even an inexperienced operator has no difficulty in withdrawing the nib with the tip attached before refusion occurs. For most metals it is preferred that a stream of hydrogen or other inert gas be passed through the tube 10 constantly to avoid oxidation.

In Fig. 3 a modified tungsten rod 15a is provided which is set within a ceramic tube 30 provided with a ceramic cap 31. In this instance the crucible 17a surmounts the tungsten rod and is smaller than the diameter of the rod beneath it. A tungsten heating coil 32 is provided within the tube and heats the rod sufficiently to melt material within the crucible.

In Fig. 4 a further modification of the heating element is provided, in this instance a tungsten rod being omitted and a ceramic post 33 being provided, surmounted by a tungsten washer 34 within which the crucible is imbedded. A ceramic tube 30b surrounds the post and outside of it a high frequency heating element 35 is provided which may be water cooled if desired. The high frequency element induces a high temperature in the tungsten washer and thereby generates the necessary heat for fusion of material within the crucible.

In the modifications shown in Figs. 3 and 4 it is generally preferable to introduce hydrogen within the ceramic tube.

Fig. 5 indicates a wiring diagram for the heating element shown in Fig. 1, 36 indicating a high voltage transformer, 37 a time switch and 38 and 39 are low voltage transformers leading to a current supply. In operation of the device, an arc is formed between the filaments 20 and 21 which are heated continuously by the low voltage current supply to ionize hydrogen within the tube 10. The ionized hydrogen permits the formation of the arc at substantially its maintenance voltage, this voltage being supplied from the high voltage transformers 36.

The invention is particularly applicable to low melt point bases to which are to be attached relatively high melt point tips. For example, it has been found highly satisfactory in the attaching of iridium or other high melt point tips to steel or stainless steel nibs.

While the invention has been described particularly in connection with pen nibs, it is applicable to other bases and tips, for example, spark plugs, meter pivots and like articles. With meter pivot staffs it is customary to use a stainless steel 0.050 inch in diameter by one-half inch long which is to be tipped with a hard metal.

The foregoing detailed description has been given for clearness of understanding only, and no unnecessary limitations should be understood therefrom, but the appended claims should be construed as broadly as permissible, in view of the prior art.

I claim:

1. The method of forming ball-shaped tips upon metallic bases, which comprises fusing a predetermined quantity of tip metal, the amount being small enough to spheroid itself by surface tension upon fusion, the fusion being carried out upon a surface not wet by the fused metal, whereby a molten spheroid of tip metal is produced, and contacting the base with the spheroid, whereby the spheroid is chilled and welded to the base, thereby forming a ball-shaped tip of predetermined size.

2. The method as set forth in claim 1, in which the base has a thickness of the order of that of a pen nib.

3. The method as set forth in claim 1, in which the tip has a relatively high melting point compared with the base.

4. The method as set forth in claim 1, in which the base is steel and the tip metal has a melting point of the order of that of iridium.

CARL PFANSTIEHL.